(12) United States Patent
Hiraoka et al.

(10) Patent No.: US 7,798,437 B2
(45) Date of Patent: Sep. 21, 2010

(54) ROTOR FOR SPINNING REEL

(75) Inventors: Hirokazu Hiraoka, Sakai (JP); Keigo Kitajima, Sakai (JP); Shingo Matsuo, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/641,335

(22) Filed: Dec. 18, 2009

(65) Prior Publication Data

US 2010/0187345 A1 Jul. 29, 2010

(30) Foreign Application Priority Data

Jan. 28, 2009 (JP) ............................. 2009-016292

(51) Int. Cl.
*A01K 89/01* (2006.01)
(52) U.S. Cl. ....................... 242/230; 242/231; 242/310; 242/311
(58) Field of Classification Search .................. 242/230, 242/231, 310, 311, 312, 313
See application file for complete search history.

(56) References Cited

U.S. PATENT DOCUMENTS 6,382,540 B1 * 5/2002 Takikura et al. ............. 242/231
6,929,204 B2 * 8/2005 Iwabuchi et al. ............ 242/231
2002/0175236 A1 * 11/2002 Hitomi ....................... 242/230

FOREIGN PATENT DOCUMENTS

JP 2003-125678 A 5/2003

* cited by examiner

*Primary Examiner*—Emmanuel M Marcelo
(74) *Attorney, Agent, or Firm*—Shinjyu Global IP (57) ABSTRACT

A rotor includes a rotor body, first to third cover members, and first and second mounting brackets. The rotor body includes a tubular member and first and second rotor arms. The first and second rotor arms extend forward from first and second sides of the rear end of the tubular member. The rotor arms are also spaced apart from the outer periphery of the tubular member. The first and second cover members cover a portion of the outside of the first and second rotor arms. The third cover member is coupled to the rear ends of the first and second cover members, and covers the rear end of the tubular member. The first and second mounting brackets are disposed in front of the third cover member so as to be covered by the first and second cover members. The first and second mounting brackets are used for mounting the third cover member to the rotor body by way of screw members.

5 Claims, 6 Drawing Sheets

ROTOR FOR SPINNING REEL

CROSS-REFERENCE TO RELATED APPLICATIONS

This application claims priority to Japanese Patent Application No. 2009-016292 filed on Jan. 28, 2009, the entirety of which is hereby incorporated by reference in its entirety.

BACKGROUND OF THE INVENTION

1. Field of the Invention

The present invention relates to a rotor, and in particular, to a rotor coupled to a pinion gear of a spinning reel so as to rotate integrally with the pinion gear and configured to reel out a fishing line forward.

2. Background Information

A spinning reel is provided with a rotor for winding a fishing line onto a spool. The rotor is integrally-rotatably coupled to a part of a reel body in front of a pinion gear rotatably supported by the reel body. The rotor includes a rotor body composed of a coupler, a first rotor arm and a second rotor atm. The coupler integrally-rotatably coupled to the pinion gear. The first rotor arm forwardly extends from a first side of the rear end of the coupler while being spaced apart from the outer periphery of the coupler. Similarly, the second rotor arm forwardly extends from a second side of the rear end of the coupler while being spaced apart from the outer periphery of the coupler. Conventionally, the conventional rotor of this type has been known to further include an outer cover member and a rear cover member. The outer cover member is composed of first and second cover members for covering outside of the first and second rotor arms of the rotor body, respectively. The rear cover member covers the rear end of the coupler. For example, Laid-Open Japan Patent Publication No. JP-A-2003-125678 discloses a rotor of this type.

The outer cover member has a externally-bulging curved face. Opposed sides of the rear cover member are joined to the rear end of the outer cover member. Therefore, the joining parts between the outer cover member and the rear cover member are formed in a three-dimensional curved shape.

The outer cover member is fixed to the outer faces of the first and second rotor arms by way of screw members (e.g., tapping screws and round-head screws). The screw members are inserted into the outer cover member in an inwardly radial direction and screwed into the first and second rotor arms.

The rear cover member is fixed to the rear face of the rotor body with screw members (e.g., tapping screws and round-head screws). The screw members are inserted into the rear cover member from behind and screwed into the rotor body. A circular opening is formed in the rear cover member for allowing a flange of the reel body to be disposed.

According to the conventional structure, screw members are used for fixation of the outer cover member and the rear cover member. Screw member are inserted into the outer cover member from its outside, whereas screw members are inserted into the rear cover member from its behind. With the configuration, through-holes are formed in the outer faces of the outer cover member and the rear face of the rear cover member for allowing the screw members to penetrate. Accordingly, the head portions of the screw members are exposed to the outside. When the head portions of the screw members are exposed to the outside, foreign substance (e.g., bait) and salt precipitated from sea water may attach thereto. Accordingly, the head portions of the screw members may corrode or the foreign substance may cause a foul order.

If the head portions of the screw members are washed with shower and the like, the foreign substance or salt attached to the head portions can be removed. In many cases, the outer cover member is attached to the first and second rotor arms without any clearance. Therefore, even if the outer cover member is washed from its outside with shower, there are less chances that water enters the interior of the rotor. Additionally, even if water attaches to the head portions of the screw members, the attached water will be scattered by centrifugal force to be generated in rotation of the rotor.

However, the opening is formed in the rear cover member for disposing the flange therein. Therefore, when the head portions of the screw members are washed with shower in order to remove the foreign substance or slat attached thereto, there are chances that water enters mechanisms in the interior of the reel body (e.g., an anti-reverse mechanism and a rotor driving mechanism) through a clearance between the opening and the flange. When water enters the interior of the rotor body, water attaches to the mechanisms disposed therein. This may cause malfunctioning of the mechanisms.

In view of the above, it will be apparent to those skilled in the art from this disclosure that there exists a need for an improved a rotor body. This invention addresses this need in the art as well as other needs, which will become apparent to those skilled in the art from this disclosure.

SUMMARY OF THE INVENTION

Accordingly, aspects of the present invention have been created to solve the above-mentioned problems occurring in the conventional practice, and to prevent a head portion of a screw member from being exposed to the outside in a structure for fixing a rear cover member to a rotor body.

According to one aspect of the present invention, a rotor for a spinning reel is configured to reel out a fishing line forward. The rotor is connected to a pinion gear of the spinning reel in order to rotate integrally with the pinion gear. The rotor comprises a rotor body including a tubular member, a first rotor arm, and a second rotor arm. The tubular member is coupled to the pinion gear to rotate integrally with the pinion gear. The first rotor arm is arranged to extend forward from a first side of a rear end of the tubular member. The second rotor arm is arranged to extend forward from a second side of the rear end of the tubular member. The first and second rotor arms are spaced apart from an outer periphery of the tubular member.

The rotor further comprises an outer cover member that covers the outside of at least either of the first and second rotor arms, and a rear cover member that covers a rear end of the tubular member. The rear cover member is coupled to a rear end of the outer cover member.

The rotor also comprises at least one mounting bracket configured to attach the rear cover member to the rotor body by way of a screw member. The mounting bracket is disposed forward of the rear cover member along the axial direction of the rotor body so that the mounting bracket is covered by the outer cover member.

According to another aspect of the present invention, the at least one mounting bracket includes an axial flange portion and a radial flange portion having a through-hole for receiving the screw member. The axial flange portion extends forward along the axial direction from a rim of the rear cover member. The radial flange portion extends from an end of the axial flange portion in a radially outward direction.

According to still another aspect of the present invention, the outer cover member includes a first cover member to cover the outside of the first rotor arm, and a second cover member to cover the outside of the second rotor arm.

According to yet another aspect of the present invention, the at least one mounting bracket further includes a first mounting bracket and a second mounting bracket. The radial flange portion for the first and second mounting brackets are disposed forward along the axial direction of where the first and second cover members are coupled to the rear cover member.

According to still a further aspect of the present invention, the first and second mounting brackets are disposed on the opposite sides of the rear cover member through a center line substantially perpendicular to and passing through an axis of rotation of the rotor.

These and other features, aspects and advantages of the present invention will become apparent to those skilled in the art from the following detailed description, which, taken in conjunction with the annexed drawings, discloses a preferred and example embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
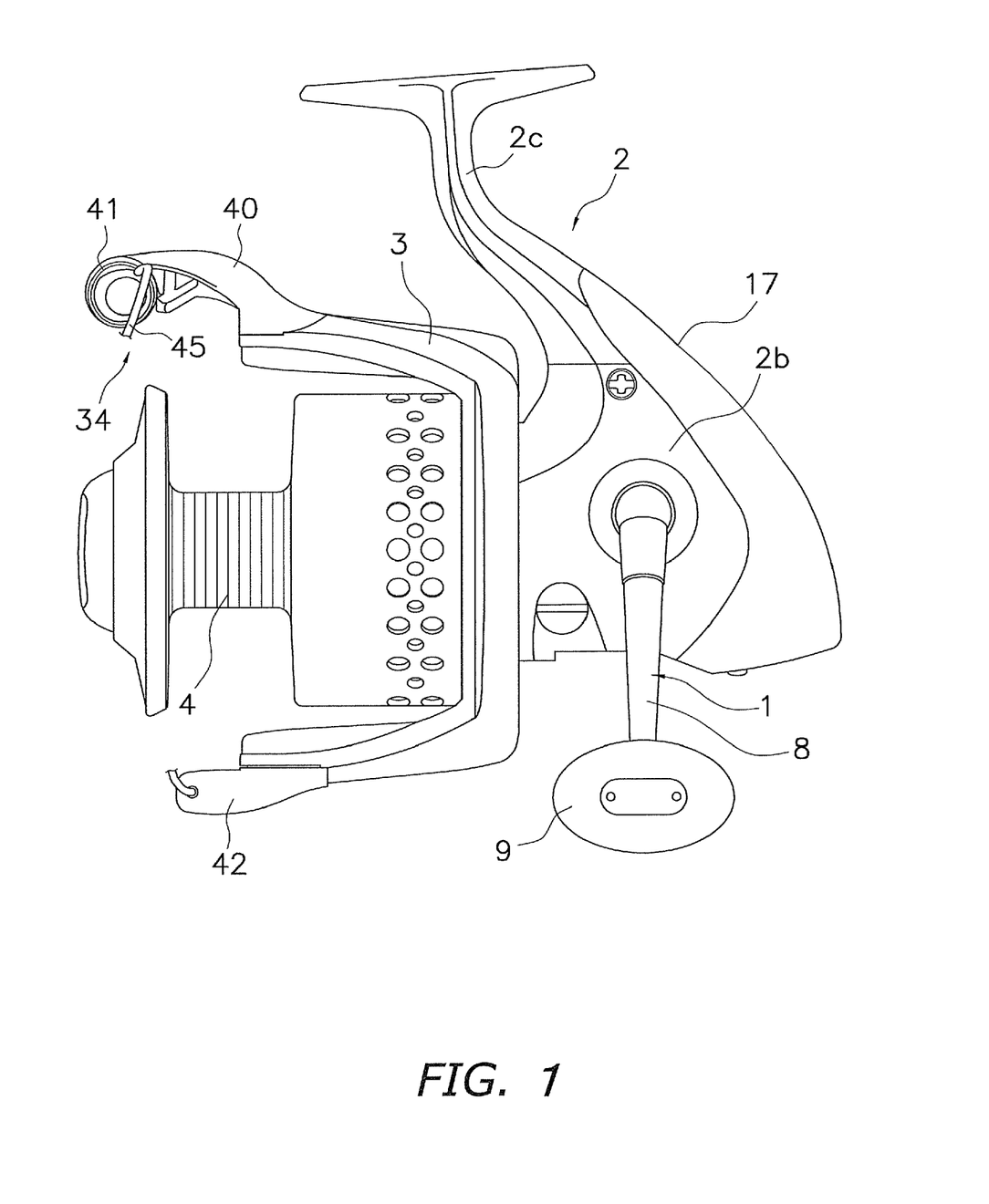
FIG. 1 is a side view of a spinning reel that an embodiment of the present invention is adopted.
Figure 2:
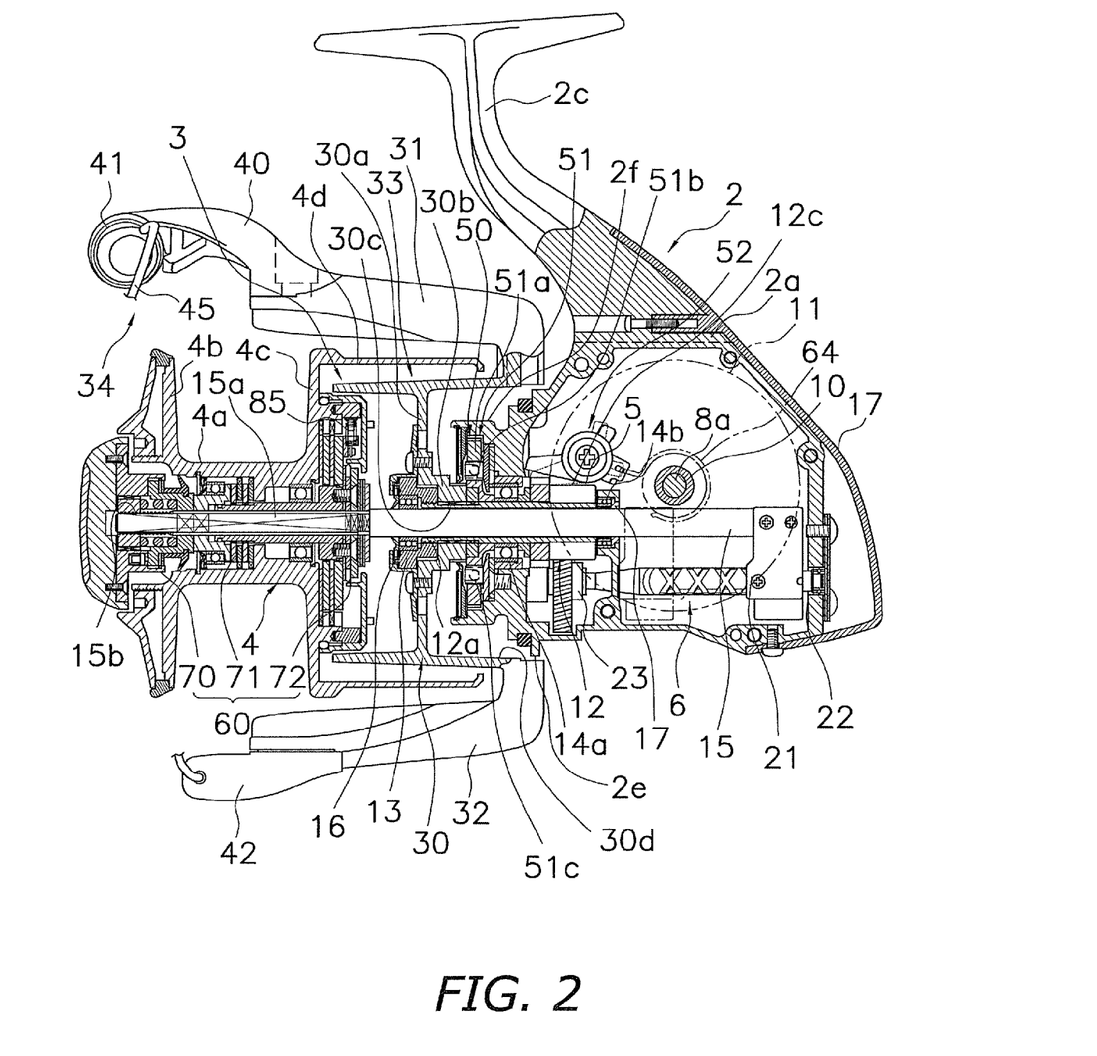
FIG. 2 is a cross-sectional side view of the spinning reel.

Referring initially to FIGS. 1 and 2, a spinning reel is illustrated in accordance with an embodiment of the present invention and includes a reel body 2, a rotor 3 and a spool 4. The reel body 2 rotatably supports a handle 1. The rotor 3 winds a fishing line onto the spool 4. The rotor 3 is rotatably supported at the front part of the reel body 2. The spool 4 winds the fishing line onto the outer periphery thereof. The spool 4, movably back and forth, is disposed at the front part of the rotor 3. The handle 1 can be attached to either the left side (see FIG. 1) or the right side of the reel body 2. As illustrated in FIGS. 1 and 2, the handle 1 includes a handle arm 8, a knob shaft (not illustrated in the figure) and a handle knob 9. The handle arm 8 is attached to the tip of a handle shaft 8a (see FIG. 2). The handle arm 8 extends perpendicular to the handle shaft 8a. The knob shaft is fixed to the tip of the handle arm 8. The handle knob 9 is rotatably attached to the knob shaft.

As illustrated in FIGS. 1 and 2, the reel body 2 includes a reel body 2a, a lid member 2b and a rod attachment leg 2c. The reel body 2a includes an opening. The reel body 2a is made of, e.g., aluminum alloy. The lid member 2b is detachably attached to the reel body 2a for covering the opening. The lid member 2b is made of e.g., aluminum alloy. The rod attachment leg 2c forwardly extends from the reel body 2a in an obliquely upward direction. The reel body 2a includes an inner space. The inner space communicates with the opening. The reel body 2a accommodates a rotor driving mechanism 5 and an oscillation mechanism 6 in the inner space. The rotor driving mechanism 5 rotates the rotor 3 in conjunction with rotation of the handle 1. The oscillation mechanism 6 moves the spool 4 back and forth for uniformly rewinding the fishing line. A flange 2e is formed in the reel body 2a and the lid member 2b. A cylindrical portion 2f is further formed in the reel body 2a. The cylindrical portion 2f forwardly protrudes from the flange 2e. A guard member 17 covers back of the reel body 2.

As illustrated in FIG. 2, the rotor driving mechanism 5 includes a main gear shaft 10, a main gear 11 and a pinion gear 12. The handle shaft 8a of the handle 1 is fixed to the main gear shaft 10. The main gear 11 is configured to rotate with the main gear shaft 10. The pinion gear 12 meshes with the main gear 11. For example, the main gear shaft 10 is a hollow shaft made of stainless alloy. Both ends of the main gear shaft 10 are supported by bearings (not illustrated in the figure) attached to the reel body 2a and the lid member 2b, respectively. Female threaded portions (not illustrated in the figure) are formed on the inner peripheral surfaces of the both ends of the main gear shaft 10. Note screw directions of the female threaded portions are different from each other.

The pinion gear 12 is a cylindrical member made of, e.g., stainless alloy. A front portion 12a of the pinion gear 12 penetrates the center part of the rotor 3. The front portion 12a is fixed to the rotor 3 by way of a nut 13. As such, the front portion 12a rotates together (or integrally) with the rotor 3. An axially intermediate portion and an axially rear end of the pinion gear 12 are rotatably supported by the reel body 2a through bearings 14a, 14b, respectively. The bearings 14a, 14b are attached to the reel body 2a while being spaced apart from each other.

The oscillation mechanism 6 moves a spool shaft 15 back and forth for reciprocating the spool 4 back and forth. Here, the spool shaft 15 is coupled to the center part of the spool 4 through a drag mechanism 60. The oscillation mechanism 6 includes a spiral shaft 21, a slider 22 and an intermediate gear 23. The spiral shaft 21 is disposed below and in parallel to the spool shaft 15. The slider 22 moves along the spiral shaft 21 back and forth. The intermediate gear 23 is fixed to the tip of the spiral shaft 21. The spiral shaft 21 is disposed in a longitudinal direction of the spinning reel. The spiral shaft 21 is rotatably supported by the reel body 2a.

The rear end of the spool shaft 15 is non-rotatably fixed to the slider 22. The slider 22 is guided by two guide shafts (not illustrated in the figure) in the longitudinal direction of the spinning reel. The guide shafts are disposed in the reel body 2a along the longitudinal direction of the spinning reel. The intermediate gear 23 meshes with the pinion gear 12.

Figure 3:
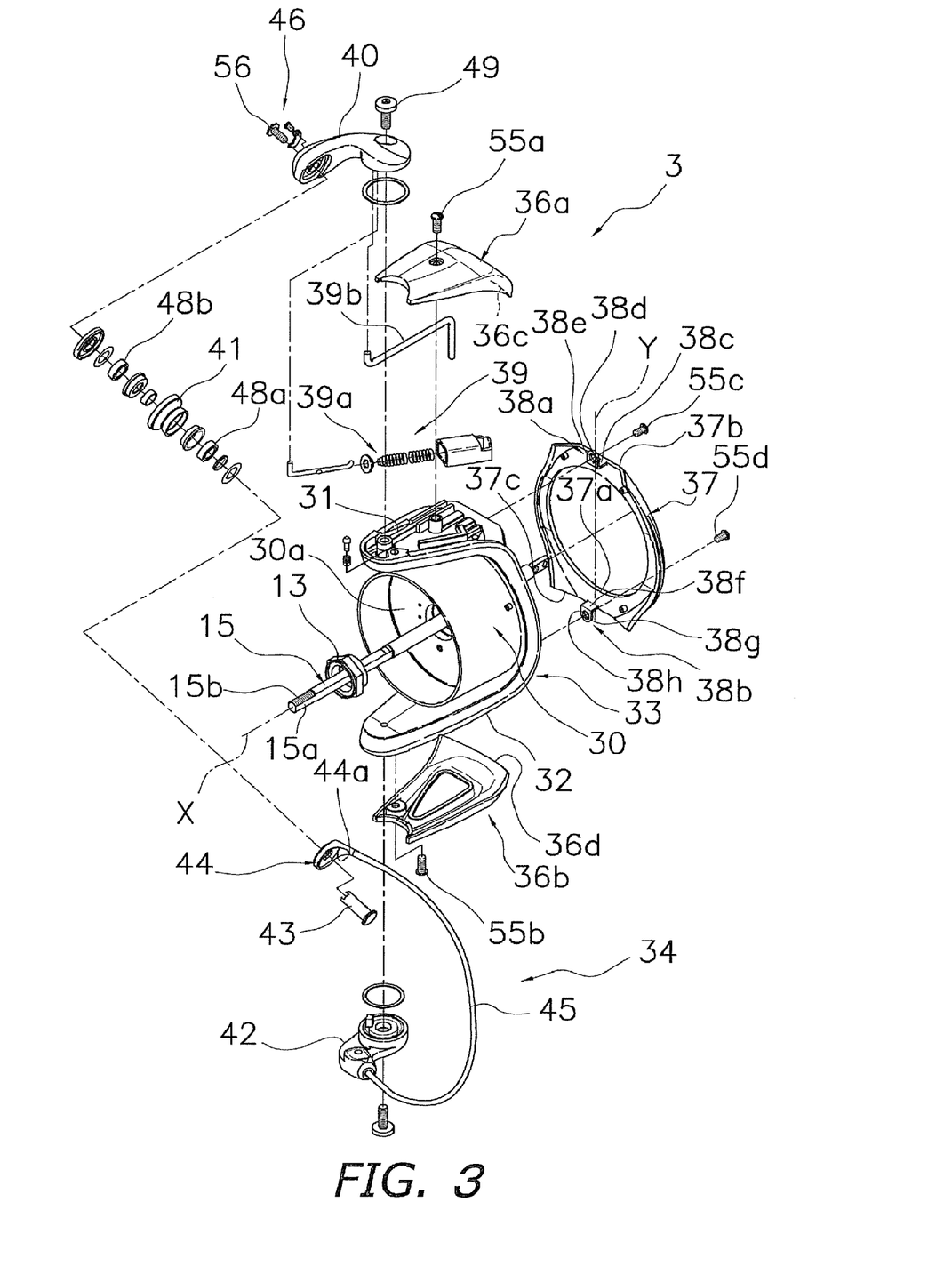
FIG. 3 is an exploded oblique view of a rotor of the spinning reel.

The spool shaft 15 penetrates the center part of the pinion gear 12. The oscillation mechanism 6 reciprocates the spool shaft 15 back and forth in the interior of the pinion gear 12. The intermediate portion of the spool shaft 15 is supported by a bearing 16 attached to the inside of the nut 13. On the other hand, the rear portion of the spool shaft 15 is supported by the inner peripheral surface of the rear part of the pinion gear 12. The structure allows the intermediate and rear portions to rotate and axially move. Electroless nickel plating is applied on the surface of the spool shaft 15 for preventing the spool shaft 15 from getting stuck with the pinion gear 12 when the spool shaft 15 moves back and forth in the relative rotation with the pinion gear 12. As illustrated in FIG. 3, a pair of interlocking faces 15a and a pair of male threaded portions 15b are foil red on the tip of the spool shaft 15. The interlocking faces 15a are opposed parallel faces and prevent the spool shaft 15 from rotating with respect to the spool 4. The male threaded portions 15b are used for regulating drag force.

Figure 4:
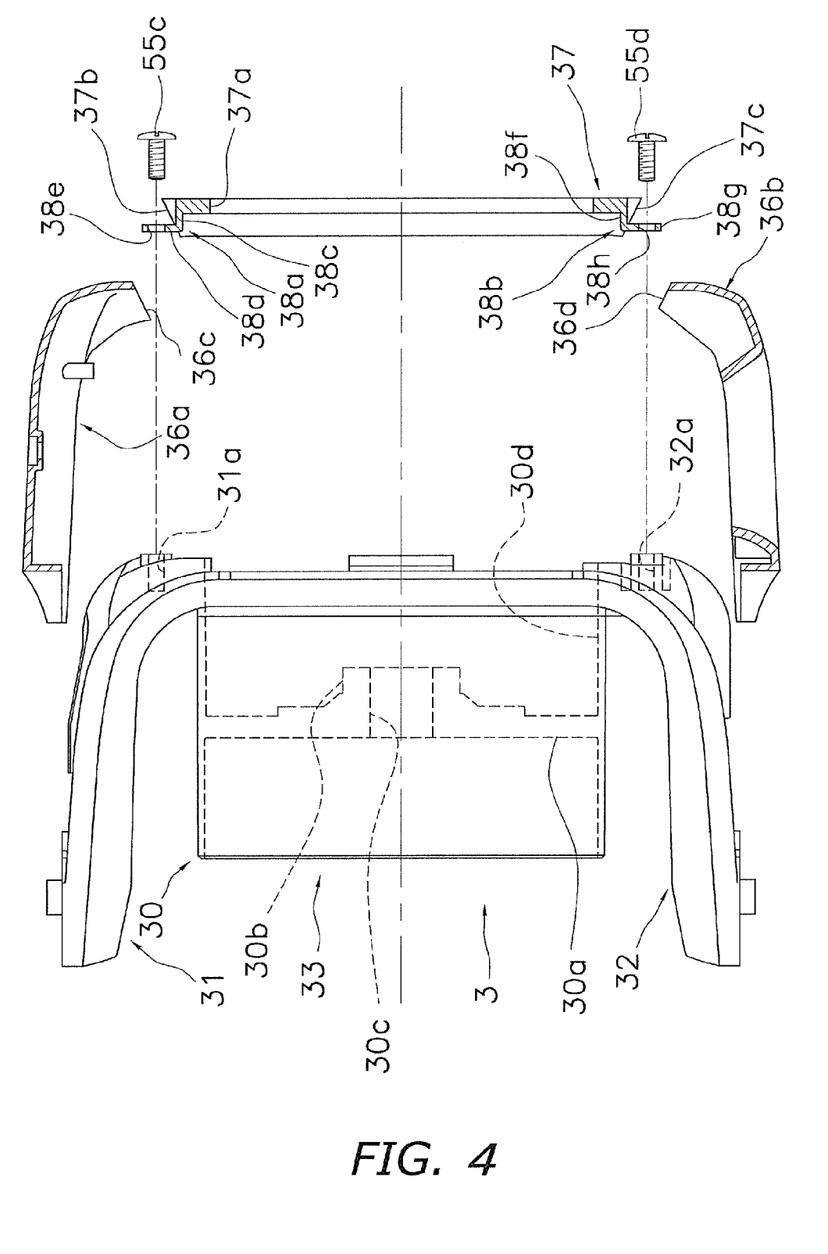
FIG. 4 is an exploded cross-sectional side view of the rotor body and first to third cover members.

As illustrated in FIGS. 2 to 4, the rotor 3 includes a rotor body 33 and a bail arm 34. The rotor body 33 is coupled to the pinion gear 12 so as to rotate together (or integrally) with the pinion gear 12. The bail arm 34 is pivotally attached to the rotor body 33. The rotor body 33 includes a tubular member 30, a first rotor arm 31 and a second rotor arm 32. The tubular member 30 is coupled to the pinion gear 12. The first rotor arm 31 forwardly extends from a first side of the rear end of the tubular member 30, whereas the second rotor arm 32 forwardly extends from a second side of the rear end of the tubular member 30. Here, the first side and the second side are opposed to each other. The first, and second rotor arms 31, 32 are spaced apart from the outer periphery of the tubular member 30. The rotor body 33 is made of, e.g., aluminum alloy.

A wall portion 30a is Ruined in the axially intermediate part of the tubular member 30. Additionally, a boss 30b is formed in the center part of the wall portion 30a. A through hole 30c is formed in the center part of the boss 30b. The spool shaft 15 and the front portion 12a of the pinion gear 12 penetrate the through hole 30c. The nut 13 is disposed in front of the wall portion 30a for fixing the rotor 3 to the pinion gear 12. A recessed portion 30d is formed in the rear part of the tubular member 30. The recessed portion 30d includes a circular space for accommodating the front part of the reel body 2.

Figure 6:
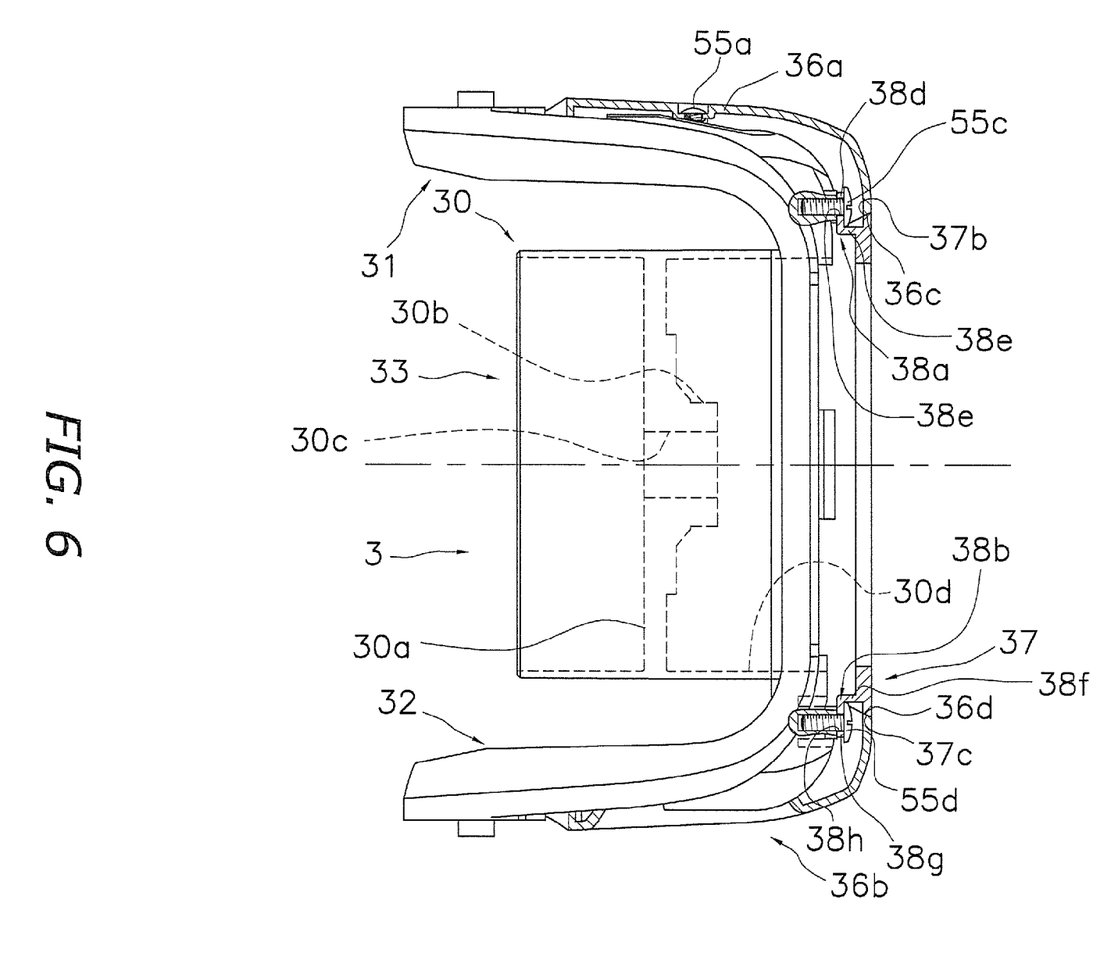
FIG. 6 is an exploded cross-sectional side view of the rotor body and first to third cover members coupled together.

The first rotor arm 31 forwardly extends from the tubular member 30 while it externally bulges. Its connection portion to the tubular member 30 expands and curves in the circumferential direction of the tubular member 30. Similarly the second rotor arm 32 forwardly extends from the tubular member 30 while it externally bulges. Its connection portion to the tubular member 30 expands and curves in the circumferential direction of the tubular member 30. Note an opening (not illustrated in the figure) is formed in the second rotor arm 32 for reducing its weight. Additionally, screw holes 31a, 32a (see FIG. 4) are faulted on the rear faces of the first and second rotor arms 31, 32 for fixing a third cover member 37 to be described. As illustrated in FIGS. 3, 4 and 6, the rotor 3 further includes first and second cover members 36a, 36b (examples of outer cover members) and the third cover member 37 (an example of a rear cover member). The first cover member 36a covers outside of the first rotor arm 31, whereas the second cover member 36b covers outside of the second rotor arm 32. The third cover member 37 covers the rear end of the tubular member 30. Moreover, the rotor 3 includes first and second mounting brackets 38a, 38b integrally formed with the third cover member 37.

The first cover member 36a has a three-dimensionally curved and externally bulged outer face. The first cover member 36a is fixed to the first rotor arm 31 of the rotor body 33 by way of a screw member 55a. Here, the screw member 55a penetrates the outer face of the first cover member 36a. Additionally, the first cover member 36a has a three-dimensionally curved joint face 36a. The joint face 36a is joined to the third cover member 37 without any clearance. A bail tripping mechanism 39 is disposed between the first cover member 36a and the first rotor arm 31.

The second cover member 36b has a three-dimensionally curved and externally bulged outer face. The second cover member 36b is fixed to the second rotor arm 32 by way of a screw member 55b. Here, the screw member 55b penetrates the outer face of the second cover member 36b. Additionally, the second cover member 36b has a three-dimensionally curved joint face 36d. The joint face 36d is joined to the third cover member 37 without any clearance.

The third cover member 37 includes an opening 37a and joint faces 37b, 37c. The opening 37a is a circular opening fanned in the center of the third cover member 37. The flange 2e of the reel body 2 can be disposed therein. The joint faces 37b, 37c are formed on the opposed ends of the third cover member 37. The joint face 37b can be joined to an end portion of the first cover member 36a, whereas the joint face 37c can be joined to an end portion of the second cover member 36b. The opening 37a exposes the recessed portion 30d that the flange 2e of the reel body 2 can be disposed. The third cover member 37 is fixed to the rotor body 33 by way of two screw members 55c, 55d. The screw members 55c, 55d pass through the mounting brackets 38a, 38b, respectively. The joint faces 37b, 37c are three-dimensionally curved and joined to the joint faces 36c, 36d without any clearance, respectively.

The first and second mounting brackets 38a, 38b are positioned in front of the third cover member 37. Accordingly, the first and second mounting brackets 38a, 38b are covered with the first and second cover members 36a, 36b, respectively. The first and second mounting brackets 38a, 38b are integrally formed with the third cover member 37 while forwardly protruding from the third cover member 37. Specifically, the first and second mounting brackets 38a, 38b are integrally formed with the third cover member 37, as a one-piece unitary member, while forwardly protruding from the joint faces 37b, 37c (examples of a rim portion) of the third cover member 37. The first mounting bracket 38a is provided for fixing the third cover member 37 to the rotor body 33 on the first rotor arm 31's side.

Figure 5:
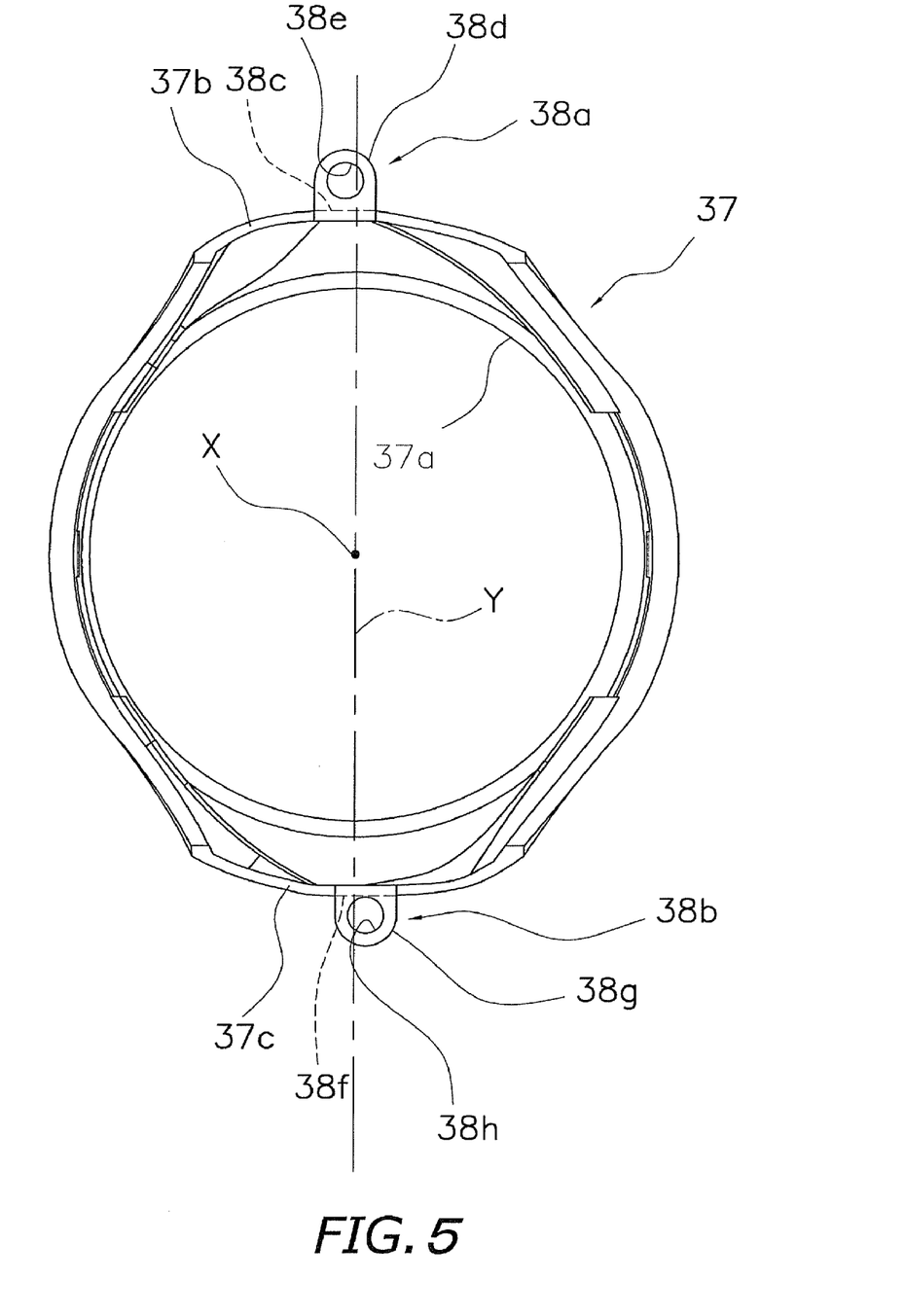
FIG. 5 is a front view of the third cover member.

When the third cover member 37 is seen from the rear side, the first mounting bracket 38a is eccentrically disposed on the right side of the center of the joint face 37b. Here, the center of the joint face 37b corresponds to a center line Y passing through a rotational axis X of the rotor 3. It should be noted that FIG. 5 illustrates the third cover member 37 seen from the front side and the first mounting bracket 38a is thereby eccentrically disposed on the left side of the center of the joint face 37b. The disposition is designed for avoiding the first mounting bracket 38a from interfering with the bail tripping mechanism 39. As illustrated in FIGS. 3 to 5, the first mounting bracket 38a includes a axial flange portion 38c and a radial flange portion 38d. The axial flange portion 38c is forwardly extended from the joint face 37b of the third cover member 37. The axial flange portion 38c is formed in a plate shape. The radial flange portion 38d extends from the protruding end of the axial flange portion 38c in an outwardly radial direction. A through hole 38e is fowled in the radial flange portion 38d for allowing the screw member 55c to penetrate. Thus, the radial flange portion 38d is positioned in front of the joint face 37b.

When the third cover member 37 is seen from the rear side, the second mounting bracket 38b is eccentrically disposed on the left side of the center of the joint face 37c. Here, the center of the joint face 37c corresponds to the center line Y passing through the rotational axis X of the rotor 3. It should be noted that FIG. 5 illustrates the third cover member 37 seen from the front side and the second mounting bracket 38b is thereby eccentrically disposed on the right side of the center of the joint face 37c. To regulate rotation balance, the disposition of the second mounting bracket 38b is designed in relation to that of the first mounting bracket 38a. The second mounting bracket 38b includes a axial flange portion 38f and a radial flange portion 38g. The axial flange portion 38f is forwardly extended from the joint face 37c of the third cover member 37.

The axial flange portion 38f is formed in a plate shape. The radial flange portion 38g extends from the protruding end of the axial flange portion 38f in an outwardly radial direction. A through hole 38h is formed in the radial flange portion 38g for allowing the screw member 55d to penetrate. Similarly to the radial flange portion 38d, the radial flange portion 38g is positioned in front of the joint face 37c.

In assembling the rotor 3, the third cover member 37 is fixed to the rear face of the rotor body 33 by way of the screw members 55c, 55d after attachment of the bail tripping mechanism 39 and the bail arm 34. In this case, a threaded portion of the screw member 55c is inserted into the through hole 38e of the first mounting bracket 38a. The threaded portion is then screwed into the screw hole 31a. Next, a threaded portion of the screw member 55d is inserted into the through hole 38h of the second mounting bracket 38b. The threaded portion is then screwed into the screw hole 31b. Thus, mounting of the third cover member 37 to the rotor body 33 is completed.

Next, the first and second cover members 36a, 36b are fixed to the first and second rotor anus 31, 32, respectively. The first and second cover members 36a, 36b are formed in a shape to cover the first and second mounting brackets 38a, 38b, respectively. When the first and second cover members 36a, 36b are attached to the first and second rotor arms 31, 32, respectively, the first and second mounting brackets 38a, 38b and the screw members 55c, 55d attached thereto are hidden and not exposed to the outside. As illustrated in FIG. 2, the bail arm 34, a fishing line guide mechanism, is attached to the tips of the first and second rotor arms 31, 32. The bail arm 34 can pivot between a fishing-line releasing posture and a fishing-line rewinding posture. The bail tripping mechanism 39 (see FIG. 3) selectively urges the bail arm 34 to either the fishing-line releasing posture or the fishing-line rewinding posture.

As illustrated in FIG. 3, the bail arm 34 includes a first bail support member 40, a second bail support member 42 and a line roller 41. The first bail support member 40 is pivotally attached to the outer peripheral side of the tip of the first rotor 31. On the other hand, the second bail support member 42 is pivotally attached to the outer peripheral side of the tip of the second rotor arm 32. The line roller 41 is attached to the tip of the first bail support member 40. Additionally, the bail arm 34 includes a pin-rod 43, a pin-rod cover 44 and a bail 45. The pin-rod 43 is fixed to the tip of the first bail support member 40 while only its one end is supported by the first bail support member 40. The pin-rod cover 44 is disposed on the tip side of the pin-rod 43. The bail 45 couples the pin-rod cover 44 and the second bail support member 42. Furthermore, the bail arm 34 includes a fastening structure 46. The fastening structure 46 includes a bolt 56 for fixing the pin-rod 43 to the first bail support member 40.

The first bail support member 40 is made of aluminum alloy. Its outer face is covered with a chrome plated metal film. The surface of the outer face is thus toughened by chrome plating. Accordingly, the outer face is protected from scratch to be caused by the contact with the fishing line. The first bail support member 40 is pivotally fixed to the first rotor arm 31 by way of an attachment bolt 49. The bolt 56 is disposed in the tip of the first bail support member 40. The pin-rod 43 is fixed by the bolt 56.

The pin-rod 43 is separately formed from the pin-rod cover 44. The pin-rod 43 is provided for fixing the pin-rod cover 44 to the first bail support member 40 and for rotatably supporting the line roller 41. The bolt 56 is screwed into the tip of the pin-rod 43.

The pin-rod cover 44 is integrally formed with the substantially U-shaped curved bail 45 as a one-piece unitary member, e.g., by forging. The pin-rod 43 can be attached to the pin-rod cover 44. The tip of the bail 45 is fixed to the second bail support member 42 by calking.

The line roller 41 is rotatably supported by the pin-rod 43 through two bearings 48a, 48b. The bearings 48a, 48b are axially spaced apart.

As illustrated in FIG. 3, the bail tripping mechanism 39 is disposed between the first rotor arm 31 and the first cover member 36a. The bail tripping mechanism 39 is configured to return the bail arm 34 from the fishing-line releasing posture to the fishing-line guide posture in conjunction with rotation of the rotor 3. In addition, the bail tripping mechanism 39 keeps the bail arm 34 in the respective postures.

The bail tripping mechanism 39 includes a toggle spring mechanism 39a, a moving member 39b, and a switch member (not illustrated in the figure). The toggle spring member 39a is pivotally attached to the first bail support member 40. The moving member 39b is attached to the first rotor arm 31 while being capable of moving roughly back and forth. The switch member is detachably attached to the flange 2e while being capable of making contact with the moving member 39b. The toggle spring mechanism 39a selectively urges the bail arm 34 to either the fishing-line releasing posture or the fishing-line guide posture. When the rotor 3 rotates in the fishing-line rewinding direction while the bail arm 34 takes the fishing-line releasing posture, the moving member 39b makes contact with the switch member. Accordingly, the bail arm 34 is moved towards the fishing-line releasing posture.

As illustrated in FIG. 2, an anti-reverse mechanism 50 is disposed in the interior of the tubular member 30 of the rotor 3 for blocking reverse rotation of the rotor 3. The anti-reverse mechanism 50 includes first and second one-way clutches 51, 52. The first one-way clutch 51 is a roller-type clutch, and its inner ring freely rotates. On the other hand, the second one-way clutch 52 is a claw-type clutch disposed on the outer peripheral side of the pinion gear 12. The first one-way clutch 51 is attached to the inside of the cylindrical portion 2f of the reel body 2a. The first one-way clutch 51 includes an outer ring 51a, an inner ring 51b and rotation-moving member 51c. The outer ring 51a is non-rotatably attached to the cylindrical portion 2f of the reel body 2a. The inner ring 51b is rotatably attached to the pinion gear 12. The rotation-moving member 51c is disposed between the outer and inner rings 51a, 51b. The rotation-moving member 51c is configured to bite into between the rings 51a, 51b in conjunction with rotation of the inner ring 51b in the fishing-line releasing direction. The first one-way clutch 51 can block reverse rotation of the rotor 3 instantly, because it is a roller-type clutch. However, allowable transmission torque of the roller-type first one-way clutch 51 is small. In response to this, the claw-type second one-way clutch 52, having large allowable transmission torque, is herein provided.

As illustrated in FIG. 2, the second one-way clutch 52 is disposed in proximity to gear teeth 12c of the pinion gear 12. The second one-way clutch 52 is an auxiliary one-way clutch configured to operate when the first one-way clutch 51 glides and reversely rotates due to large load acting on the rotor 3 in the fishing-line releasing direction.

The anti-reverse mechanism 50 constantly blocks reverse rotation (i.e., rotation in the fishing-line releasing direction) of the rotor 3. Therefore, the anti-reverse mechanism 50 never takes an action for allowing reverse rotation of the rotor 3.

As illustrated in FIG. 2, the spool 4 are disposed between the first and second rotor arms 31, 32 of the rotor 3. The spool 4 is rotatably supported by the tip of the spool shaft 15. The spool 4 includes a bobbin trunk 4a, front and rear flanges 4b, 4c, and a skirt 4d. The bobbin trunk 4a is attached to the spool shaft 15, and the fishing line is wound around its outer periphery. The bobbin trunk 4a is made of, e.g., aluminum alloy. The front flange 4b is fowled on the front part of the bobbin trunk 4a, whereas the rear flange 4c is formed on the rear part of the bobbin trunk 4a. The front and rear flanges 4b, 4c are integrally Rained with the bobbin trunk 4a as a one-piece unitary member. The skirt 4d is a hollow cylinder member integrally formed with the rear flange 4c as a one-piece unitary member. The spool 4 accommodates the drag mechanism 60 and a drag sound producing mechanism 85. The drag mechanism 60 brakes the spool 4 by applying predetermined drag force thereto. The drag sound producing mechanism 85 produces sound in the drag operation.

As illustrated in FIG. 2, the drag mechanism 60 is a mechanism for applying the drag force to the spool 4 by braking a rotation of the spool 4 in the fishing-line releasing direction. The drag mechanism 60 includes a drag knob assembly 70 and front and rear friction parts 71, 72. The drag knob assembly 70 is used for manually regulating the drag force. The front and rear friction parts 71, 72 are pressed towards the spool 4 when the drag knob assembly 70 is handled to regulate drag force. The drag knob assembly 70 is disposed in the front part of the spool 4. The front friction part 71 is disposed in the interior of the bobbin trunk 4a of the spool 4, whereas the rear friction part 72 is disposed behind the rear flange 4c.

In casting, the bail arm 34 is flipped to the fishing-line releasing posture. In response to this, the first and second bail support members 40, 42 pivot. In the condition, an angler casts the fishing rod while holding the fishing line with his/her index finger of the hand grabbing the fishing rod. Accordingly, the fishing line is swiftly released because of weight of terminal tackle. When the handle 1 is rotated in the fishing-line rewinding direction in this condition, the rotor driving mechanism 5 rotates the rotor 3 in the fishing-line rewinding direction and the bail tripping mechanism 39 returns the bail arm 34 to the fishing-line rewinding position. Accordingly, the fishing is wound around the spool 4 while moving from the bail 45 to the line roller 41. In this case, the first and second mounting brackets 38a, 38b are appropriately disposed in consideration of rotation balance. Therefore, it is possible to prevent deterioration of the rotation balance due to the first and second mounting brackets 38a, 38b.

(A) The first and second mounting brackets 38a, 38b are provided for mounting of the third cover member 37 covering the rear face of the rotor body 33. Furthermore, the first and second mounting brackets 38a, 38b are covered with the first and second cover members 36a, 36b, respectively. With the structure, the outer face of the rotor body 33 is covered with the first and second cover members 36a, 36b. Simultaneously, the first and second mounting brackets 38a, 38b are not exposed to the outside because they are covered with the first and second cover members 36a, 36b. Also, the third cover member 37 is fixed to the rotor body 33 by way of the screw members 55c, 55d through the first and second mounting brackets 38a, 38b covered with the first and second cover members 36a, 36b, respectively. With the structure, the flange portions of the third cover member 37 are covered with the first and second cover members 36a, 36b. Accordingly, the screw members 55c, 55d are concealed from the outside. In other words, the head portions of the screw members 55c, 55d are not exposed to the outside.

(B) The first mounting bracket 38a includes the axial flange portion 38c and the radial flange portion 38d, whereas the second mounting bracket 38b includes the axial flange portion 38f and the radial flange portion 38g. The axial flange portions 38c, 38d are formed in a plate shape, and forwardly extends from the joint faces 37b, 37c of the third cover member 37, respectively. The radial portions 38d, 38g extend from the protruding ends of the axial flange portions 38c, 38f in outwardly radial directions. The radial flange portions 38d, 38g include the through holes 38e, 38h for allowing the screw members 55c, 55d to penetrate, respectively.

With the structure, the third cover member 37 can be fixed to the rotor body 33 by the screw members 55c, 55d passing through the radial flange portions 38d, 38g extending in outwardly radial directions, respectively. Accordingly, with the radial flange portions 38d, 38g, the third cover member 37 can be appropriately arranged in the back and forth direction. Therefore, even when the first and second cover members 36a, 36b and the third cover member 37 are fouled by die casting, the first and second cover members 36a, 36b and the third cover member 37 are easily matched at their joint portions.

(C) The first and second mounting brackets 38a, 38b are disposed on the opposite sides through the center line Y of the third cover member 37 that passes through the rotational axis X of the rotor 3.

In this case, the first and second mounting brackets 38a, 38b are disposed on the opposed sides through the center line of the rear cover member. Therefore, through holes are formed on the opposite sides through the center line. With the configuration, it is possible to prevent deterioration of rotation balance to be caused by disposition of the first and second mounting brackets 38a, 38b on eccentric positions through the center line Y, even if through holes cannot be formed on the center line due to disposition of a mechanism part of, e.g., the bail tripping mechanism in at least either of two rotor arms.

Other Example Embodiments

An embodiment of the present invention has been explained. However, the present invention is not limited to the aforementioned embodiment. A variety of changes and modifications are possible for the aforementioned embodiment without departing from the scope of the present invention.

(a) In the aforementioned embodiment, the first and second mounting brackets 38a, 38b are integrally formed with the third cover member 37 as a one-piece unitary member. However, they may be formed as separate components.

(b) In the aforementioned embodiment, the first and second cover members 36a, 36b are provided as the outer cover members for the first and second rotor arms 31, 32, respectively. However, only one of the rotor arms 31, 32 may be provided with the outer cover member. In this case, the other of the rotor arms 31, 32 without the outer cover member may be elastically engaged with the rear cover member, for instance.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," "with" and their derivatives. Also, the term "part," "section," "portion," "member," or "element" when used in the singular can have the dual meaning of a single part or a plurality of parts.

As used herein, the following directional terms "forward", "rearward", "above", "below", "downward", "upward", "vertical", "horizontal", "inner", "outer", "longitudinal" and "transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device implies the existence of other unclaimed or unmentioned components, sections or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A rotor for a spinning reel configured to reel out a fishing line forward, the rotor being connected to a pinion gear of the spinning reel to rotate integrally with the pinion gear, the rotor comprising:

a rotor body including a tubular member, a first rotor arm, and a second rotor arm, the tubular member being coupled to the pinion gear to rotate integrally with the pinion gear, the first rotor arm being arranged to extend forward from a first side of a rear end of the tubular member, the second rotor arm being arranged to extend forward from a second side of the rear end of the tubular member, the first and second rotor arms being spaced apart from an outer periphery of the tubular member;

an outer cover member configured to cover the outside of at least either of the first and second rotor arms; and a separate rear cover member coupled to a rear end of the outer cover member and configured to cover a rear end of the tubular member, the rear cover member including at least one mounting bracket configured to attach the rear cover member to the rotor body by way of a screw member, the mounting bracket being disposed forward of the rear cover member along the axial direction of the rotor body so as to be covered by the outer cover member, each of the mounting brackets having an axial flange portion and a radial flange portion with a through-hole to accommodate the screw member, the axial flange portion extending forward along the axial direction from a rim of the rear cover member and the radial flange portion extending from an end of the axial flange portion in a radially outward direction.

2. The rotor for a spinning reel according to claim 1, wherein the at least one mounting bracket includes a first mounting bracket and a second mounting bracket.

3. The rotor for a spinning reel according to claim 2, wherein the outer cover member includes a first cover member configured to cover the outside of the first rotor arm and a second cover member configured to cover the outside of the second rotor arm.

4. The rotor for a spinning reel according to claim 2, wherein the radial flange portions of the first and second mounting brackets are disposed forward along the axial direction of where the first and second cover members are coupled to the rear cover member.

5. The rotor for a spinning reel according to claim 2, wherein the first and second mounting brackets are disposed on the opposite sides of the rear cover member through a center line substantially perpendicular to and passing through an axis of rotation of the rotor.

* * * * *